US009046005B2

(12) United States Patent
Zhang et al.

(10) Patent No.: US 9,046,005 B2
(45) Date of Patent: Jun. 2, 2015

(54) GAS TURBINE EXHAUST DIFFUSER WITH HELICAL TURBULATOR

(71) Applicant: General Electric Company, Schenectady, NY (US)

(72) Inventors: Hua Zhang, Greer, SC (US); Douglas Scott Byrd, Greer, SC (US); Laxmikant Merchant, Bangalore (IN); Valery Ivanovich Ponyavin, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 126 days.

(21) Appl. No.: 13/855,907

(22) Filed: Apr. 3, 2013

(65) Prior Publication Data

US 2014/0298771 A1 Oct. 9, 2014

(51) Int. Cl.
*F02C 6/18* (2006.01)
*F01D 25/30* (2006.01)
*F02K 1/82* (2006.01)

(52) U.S. Cl.
CPC ............... *F01D 25/30* (2013.01); *F02K 1/822* (2013.01); *F01D 25/305* (2013.01); *F02C 6/18* (2013.01); *F05D 2250/232* (2013.01); *F05D 2250/25* (2013.01)

(58) Field of Classification Search
CPC ......... F01D 9/04; F01D 25/30; F01D 25/305; F02K 1/04; F02K 1/386; F02K 1/822; F28F 1/00; F05D 2250/25
USPC .......... 60/39.5, 770, 771, 262, 266, 806, 230, 60/320, 311; 239/265.27, 265.25; 181/213, 220, 215; 165/151, 152, 179
See application file for complete search history.

(56) References Cited

U.S. PATENT DOCUMENTS

| 5,016,436 | A | * | 5/1991 | Belcher et al. ................... 60/264 |
| 5,056,307 | A | * | 10/1991 | Liang ............................ 60/226.1 |
| 5,284,427 | A | * | 2/1994 | Wacker ........................... 418/83 |
| 6,482,485 | B1 | * | 11/2002 | Pichon .......................... 428/36.9 |
| 6,804,947 | B2 | * | 10/2004 | Le Docte et al. ............ 60/226.2 |
| 6,866,479 | B2 | * | 3/2005 | Ishizaka et al. ............. 415/209.1 |
| 7,316,109 | B2 | * | 1/2008 | Clerc et al. ...................... 60/311 |
| 2010/0303607 | A1 | * | 12/2010 | Orosa ............................... 415/1 |

FOREIGN PATENT DOCUMENTS

EP 0035838 A1 2/1981
EP 0395766 A1 11/1990

* cited by examiner

*Primary Examiner* — Phutthiwat Wongwian
*Assistant Examiner* — Alain Chau
(74) *Attorney, Agent, or Firm* — Dority & Manning, PA

(57) ABSTRACT

A gas turbine exhaust diffuser includes a frustoconical portion that defines an interior surface and an axial centerline. In particular embodiments, the interior surface may have a slope greater than 6 degrees, 10 degrees, or 20 degrees with respect to the axial centerline to define an axial cross-sectional area of at least 200 square feet, 240 square feet, or 260 square feet. In other particular embodiments, the interior surface may have an axial length of less than 25 feet or less than 10 feet. A helical turbulator on the interior surface of the frustoconical portion may reduce flow separation between exhaust gases and the interior surface to enhance recovery of potential energy from the exhaust gases.

17 Claims, 3 Drawing Sheets

GAS TURBINE EXHAUST DIFFUSER WITH HELICAL TURBULATOR

FIELD OF THE INVENTION

The present invention generally involves an exhaust diffuser for a gas turbine or other turbomachine.

BACKGROUND OF THE INVENTION

Gas turbines are widely used in industrial and commercial operations. A typical gas turbine includes an axial compressor at the front, one or more combustors around the middle, and a turbine at the rear. The compressor includes multiple stages of rotating blades and stationary vanes. Ambient air enters the compressor, and the rotating blades and stationary vanes progressively impart kinetic energy to the working fluid (air) to bring it to a highly energized state. The working fluid exits the compressor and flows to the combustors where it mixes with fuel and ignites to generate combustion gases having a high temperature and pressure. The combustion gases exit the combustors and flow to the turbine where they expand to produce work. The combustion gases exit the turbine as exhaust gases and flow through an exhaust section downstream from the turbine. The exhaust section generally includes an exhaust diffuser having an increasing cross-sectional area. The increasing cross-sectional area of the exhaust diffuser decreases the velocity and increases the static pressure of the exhaust gases, converting the kinetic energy of the exhaust gases into potential energy.

Various factors influence the length and width of the exhaust diffuser. For example, the cross-sectional area of the exhaust diffuser generally determines the maximum energy that may be recovered from the exhaust gases. For a given cross-sectional area at the outlet, a slight increase in the cross-sectional area axially through the exhaust diffuser increases the recovery of potential energy from the exhaust gases, but results in a longer exhaust diffuser. Conversely, a rapid increase in the cross-sectional area axially through the exhaust diffuser results in a shorter exhaust diffuser for the same cross-sectional area at the outlet, but may also allow the exhaust gases to separate from the exhaust diffuser, reducing the recovery of potential energy from the exhaust gases. Therefore, a gas turbine exhaust diffuser that enhances efficiency of the gas turbine in a shorter length would be useful.

BRIEF DESCRIPTION OF THE INVENTION

Aspects and advantages of the invention are set forth below in the following description, or may be obvious from the description, or may be learned through practice of the invention.

One embodiment of the present invention is a gas turbine exhaust diffuser that includes a frustoconical portion that defines an interior surface and an axial centerline. A helical turbulator is on the interior surface of the frustoconical portion, and the interior surface has a slope greater than 6 degrees with respect to the axial centerline.

Another embodiment of the present invention is a gas turbine exhaust diffuser that includes a frustoconical portion that defines an interior surface and an axial centerline. A helical turbulator is on the interior surface of the frustoconical portion, and the interior surface has an axial length of less than 25 feet.

The present invention may also include a gas turbine having a compressor, a plurality of combustors downstream from the compressor, and a turbine downstream from the plurality of combustors. A frustoconical portion downstream from the turbine defines an interior surface and an axial centerline. A helical turbulator is on the interior surface of the frustoconical portion. The interior surface has a slope greater than 6 degrees with respect to the axial centerline or an axial length less than 25 feet.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
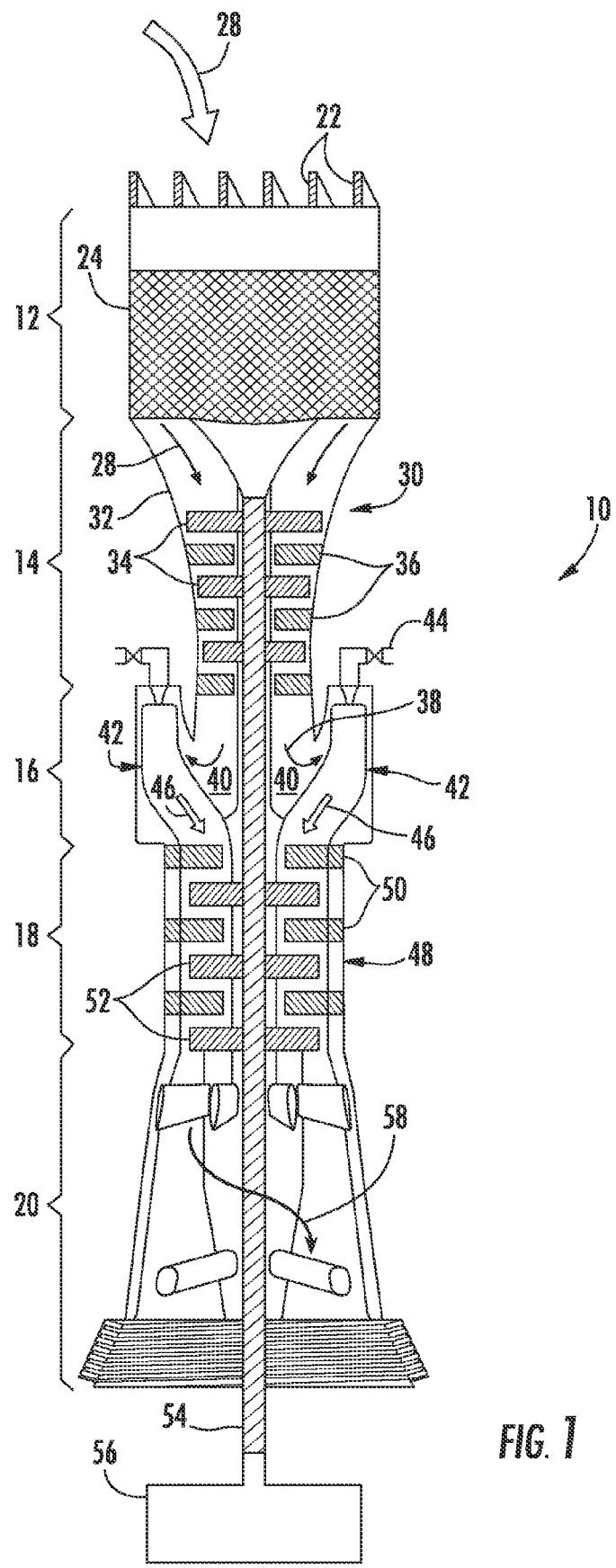
FIG. 1 is a simplified side cross-section view of an exemplary gas turbine according to various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a gas turbine exhaust diffuser that includes a frustoconical portion that defines an interior surface and an axial centerline. In particular embodiments, the interior surface may have a slope greater than 6 degrees, 10 degrees, or 20 degrees with respect to the axial centerline to define an axial cross-sectional area of at least 200 square feet, 240 square feet, or 260 square feet. In other particular embodiments, the interior surface may have an axial length of less than 25 feet or less than 10 feet. A helical turbulator on the interior surface of the frustoconical portion may reduce flow separation between exhaust gases and the interior surface to enhance recovery of potential energy from the exhaust gases. In particular embodiments, the exhaust diffuser may include a fluid passage inside the helical turbulator, while in other particular embodiments, the helical turbulator may define a spiral on the interior surface of the frustoconical portion in a first direction, and exhaust gases flow through the frustoconical portion in a second direction opposite to the first direction.

Referring now to the drawings, wherein identical numerals indicate the same elements throughout the figures, FIG. 1 provides a simplified side cross-section view of an exemplary gas turbine 10 that may incorporate various embodiments of the present invention. As shown, the gas turbine 10 may generally include an inlet section 12, a compressor section 14, a combustion section 16, a turbine section 18, and an exhaust section 20. The inlet section 12 may include a series of filters 22 and one or more fluid conditioning devices 24 to clean, heat, cool, moisturize, de-moisturize, and/or otherwise condition a working fluid (e.g., air) 28 entering the gas turbine 10. The cleaned and conditioned working fluid 28 flows to a compressor 30 in the compressor section 14. A compressor casing 32 contains the working fluid 28 as alternating stages of rotating blades 34 and stationary vanes 36 progressively accelerate and redirect the working fluid 28 to produce a continuous flow of compressed working fluid 38 at a higher temperature and pressure.

The majority of the compressed working fluid 38 flows through a compressor discharge plenum 40 to one or more combustors 42 in the combustion section 16. A fuel supply 44 in fluid communication with each combustor 42 supplies a fuel to each combustor 42. Possible fuels may include, for example, blast furnace gas, coke oven gas, natural gas, methane, vaporized liquefied natural gas (LNG), hydrogen, syngas, butane, propane, olefins, diesel, petroleum distillates, and combinations thereof. The compressed working fluid 38 mixes with the fuel and ignites to generate combustion gases 46 having a high temperature and pressure.

The combustion gases 46 flow along a hot gas path through a turbine 48 in the turbine section 18 where they expand to produce work. Specifically, the combustion gases 46 may flow across alternating stages of stationary nozzles 50 and rotating buckets 52 in the turbine 48. The stationary nozzles 50 redirect the combustion gases 46 onto the next stage of rotating buckets 52, and the combustion gases 46 expand as they pass over the rotating buckets 52, causing the rotating buckets 52 to rotate. The rotating buckets 52 may connect to a shaft 54 that is coupled to the compressor 30 so that rotation of the shaft 54 drives the compressor 30 to produce the compressed working fluid 38. Alternately or in addition, the shaft 54 may connect to a generator 56 for producing electricity.

Figure 2:
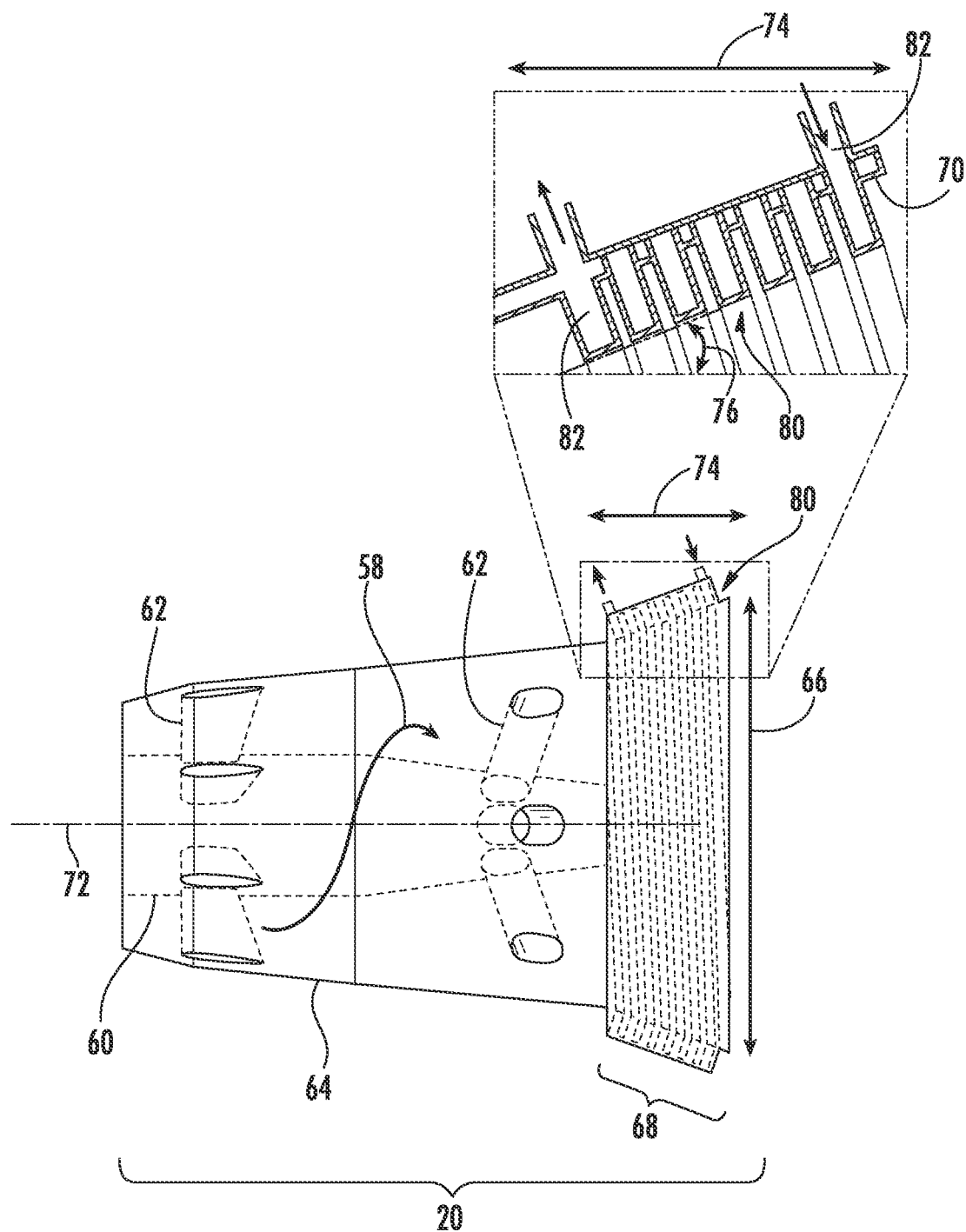
FIG. 2 is an enlarged side cross-section view of the exhaust section shown in FIG. 1 according to one embodiment of the present invention.

Exhaust gases 58 from the turbine section 18 flow through the exhaust section 20, and FIG. 2 provides an enlarged side cross-section view of the exhaust section 20 shown in FIG. 1 according to one embodiment of the present invention. As shown, the exhaust section 20 generally includes a casing 60 around the shaft 54 (not visible in FIG. 2), and struts 62 may extend from the casing 60 to support an exhaust diffuser 64. In the context of the present invention, the term "strut" includes any structure or supporting member that extends between the casing 60 and the exhaust diffuser 64. The exhaust diffuser 64 extends axially along the length of the exhaust section 20 to define a gradually increasing cross-sectional area 66 through which the exhaust gases 58 flow. The exhaust diffuser 64 terminates in a frustoconical portion 68 that defines an interior surface 70 and an axial centerline 72.

The interior surface 70 of the frustoconical portion 68 has a length 74 and a slope 76 with respect to the axial centerline 72 that combine to determine the cross-sectional area 66 at the outlet of the exhaust diffuser 64. In particular embodiments, for example, the length 74 of the interior surface 70 of the frustoconical portion 68 may be less than 25 feet, less than 15 feet, or less than 10 feet, and the slope 76 may be greater than 6 degrees, greater than 10 degrees, or greater than 20 degrees with respect to the axial centerline 72. Depending on the combination of length 74 and slope 76, the cross-sectional area 66 at the outlet of the exhaust diffuser 64 may be more than 200 square feet, more than 240 square feet, or more than 260 square feet to achieve the desired recovery of potential energy from the exhaust gases 58.

As shown in FIG. 2, the interior surface 70 of the frustoconical portion 68 includes a helical turbulator 80. The helical turbulator 80 may include any combination of ribs, grooves, fins, or tubes that form a helical path or spiral along the interior surface 70 to reduce flow separation between the exhaust gases 58 and the interior surface 70. In particular embodiments, for example, the angle of the helical path may range from less than approximately 3 degrees to more than 20 degrees. In the particular embodiment shown in FIG. 2, the helical path formed by the frustoconical portion 68 spirals in the opposite direction compared to the exhaust gases 58 flowing through the frustoconical portion 68 to reduce the amount of swirl in the exhaust gases 58 for downstream components. Alternately or in addition, the helical turbulator 80 may include a fluid passage 82 inside at least a portion of the helical turbulator 80. In this manner, a fluid such as fuel, air, or another cooling media may be circulated through the fluid passage 82 to extract additional energy from the exhaust gases 58.

Figure 3:
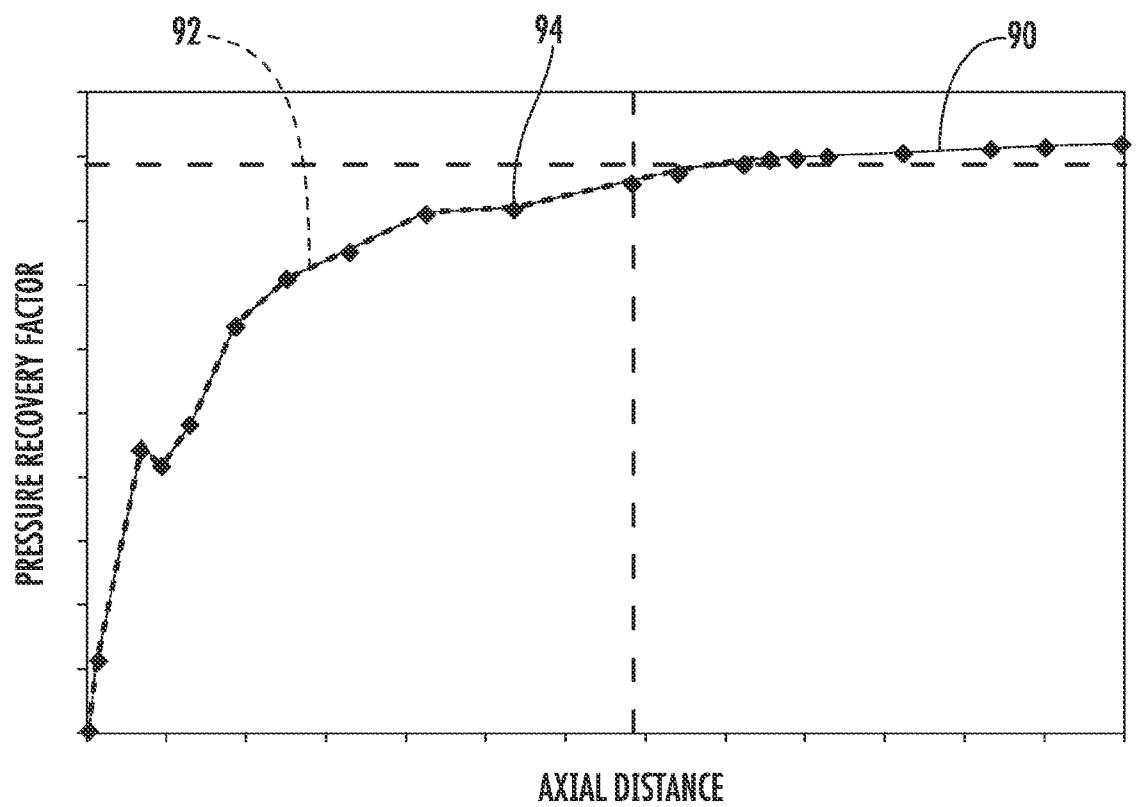
FIG. 3 is an exemplary graphs of axial pressure recovery through the exhaust section shown in FIG. 2 compared to a conventional exhaust section.

FIG. 3 provides exemplary graphs of axial pressure recovery for a conventional exhaust section, curve 90, compared to the exhaust section 20 shown in FIG. 2, curve 92. The conventional exhaust section is identical to the exhaust section 20 shown in FIG. 2 except for the frustoconical portion. As a result, the two curves 90, 92 are identical until the point 94 where the frustoconical portion begins.

In the conventional exhaust section, the exhaust diffuser includes a frustoconical portion that defines an interior surface. However, the slope of the interior surface is less than 6 degrees with respect to the axial centerline, and the interior surface extends axially greater than 25 feet to achieve a cross-sectional area of approximately 260 square feet. In addition, the exhaust diffuser does not include a helical turbulator. In contrast, the slope 76 of the interior surface 70 of the frustoconical portion 68 of the exhaust diffuser 64 shown in FIG. 2 is approximately 20 degrees with respect to the axial centerline 72, and the length 74 of the interior surface 70 is approximately 10 feet to achieve a cross-sectional area of approximately 260 square feet.

As shown in FIG. 3, the combination of the increased slope 76 and helical turbulator 80 enables the exhaust section 20 shown in FIG. 2 to achieve a pressure recovery comparable to the conventional exhaust section, even though the exhaust diffuser 64 and frustoconical portion 68 of the exhaust section 20 shown in FIG. 2 is approximately 15 feet shorter than for the conventional exhaust section. As a result, exhaust diffusers 64 within the scope of various embodiments of the present invention should enhance efficiency of the exhaust section 20 while occupying substantially less space. The shorter exhaust section 20 will also reduce capital costs associated with the exhaust section 20 and auxiliary systems used to support the shaft 54 and casing 60.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A gas turbine exhaust diffuser, comprising:
   a. a frustoconical portion that defines an interior surface and an axial centerline, wherein the frustoconical portion circumferentially surrounds an inner casing of the gas turbine, wherein the inner casing is radially spaced from the interior surface to define a cross sectional flow area therebetween for directing exhaust gas therethrough;
   b. a plurality of struts that extend from the inner casing to the interior surface of the frustoconical portion within the cross sectional flow area;
   c. a helical turbulator on the interior surface of the frustoconical portion, wherein at least a portion of the helical turbulator defines a fluid passage therein that is fluidly isolated from the exhaust gas, the fluid passage having an inlet and an outlet defined outside of the frustoconical portion; and
   d. wherein the interior surface has a slope greater than 6 degrees with respect to the axial centerline.

2. The gas turbine exhaust diffuser as in claim 1, wherein the slope of the interior surface is greater than 10 degrees with respect to the axial centerline.

3. The gas turbine exhaust diffuser as in claim 1, wherein the slope of the interior surface is greater than 20 degrees with respect to the axial centerline.

4. The gas turbine exhaust diffuser as in claim 1, wherein the interior surface has an axial length of greater than zero feet but less than 25 feet.

5. The gas turbine exhaust diffuser as in claim 1, wherein the helical turbulator defines a spiral on the interior surface of the frustoconical portion, wherein the spiral is oriented in a direction that is opposite to a flow direction of exhaust gases that flow into the frustoconical portion.

6. The gas turbine exhaust diffuser as in claim 1, wherein the frustoconical portion has an axial cross-sectional area of at least 200 square feet at an outlet of the diffuser.

7. A gas turbine exhaust diffuser, comprising:
   a. a frustoconical portion that defines an interior surface and an axial centerline, wherein the frustoconical portion circumferentially surrounds an inner casing of the gas turbine, wherein the inner casing is radially spaced from the interior surface to define a cross sectional flow area therebetween for directing exhaust gas therethrough;
   b. a helical turbulator on the interior surface of the frustoconical portion, wherein at least a portion of the helical turbulator defines a fluid passage therein that is fluidly isolated from the exhaust gas; and
   c. wherein the interior surface has an axial length of greater than zero feet but less than 25 feet.

8. The gas turbine exhaust diffuser as in claim 7, wherein the axial length of the interior surface is greater than zero feet but less than 10 feet.

9. The gas turbine exhaust diffuser as in claim 7, wherein the interior surface has a slope greater than 10 degrees with respect to the axial centerline.

10. The gas turbine exhaust diffuser as in claim 7, wherein the interior surface has a slope greater than 20 degrees with respect to the axial centerline.

11. The gas turbine exhaust diffuser as in claim 1, wherein the helical turbulator defines a spiral on the interior surface of the frustoconical portion, wherein the spiral is oriented in a direction that is opposite to a flow direction of exhaust gases that flow into the frustoconical portion.

12. The gas turbine exhaust diffuser as in claim 7, wherein the frustoconical portion has an axial cross-sectional area of at least 200 square feet at an outlet of the diffuser.

13. A gas turbine, comprising:
   a. a compressor;
   b. a plurality of combustors downstream from the compressor;
   c. a turbine downstream from the plurality of combustors; and
   d. a frustoconical portion downstream from the turbine, wherein the frustoconical portion defines an interior surface and an axial centerline, wherein the frustoconical portion circumferentially surrounds an inner casing of the gas turbine, wherein the inner casing is radially spaced from the interior surface to define a cross sectional flow area therebetween for directing exhaust gas therethrough;
   e. a helical turbulator on the interior surface of the frustoconical portion, wherein at least a portion of the helical turbulator defines a fluid passage therein that is fluidly isolated from the exhaust gas, the fluid passage having an inlet and an outlet defined outside of the frustoconical portion; and
   f. wherein the interior surface has a slope greater than 6 degrees with respect to the axial centerline or an axial length greater than zero feet but less than 25 feet.

14. The gas turbine as in claim 13, wherein the slope of the interior surface is greater than 6 degrees with respect to the axial centerline and the axial length of the interior surface is greater than zero feet but less than 25 feet.

15. The gas turbine as in claim 13, wherein the slope of the interior surface is greater than 20 degrees with respect to the axial centerline and the axial length of the interior surface is greater than zero feet but less than 10 feet.

16. The gas turbine as in claim 13, wherein the helical turbulator defines a spiral on the interior surface of the frustoconical portion, wherein the spiral is oriented in a direction that is opposite to a flow direction of exhaust gases that flow into the frustoconical portion.

17. The gas turbine as in claim 13, wherein the frustoconical portion has an axial cross-sectional area of at least 200 square feet at an outlet of the frustoconical portion.

* * * * *